(12) United States Patent
Kafrawy

(10) Patent No.: US 7,280,036 B2
(45) Date of Patent: Oct. 9, 2007

(54) DETECTION AND WARNING SYSTEM

(76) Inventor: Eric Adel Kafrawy, 16 Cooke Ave., Kingston, MA (US) 02364

( * ) Notice: Subject to any disclaimer, the term of this patent is extended or adjusted under 35 U.S.C. 154(b) by 190 days.

(21) Appl. No.: 11/122,934

(22) Filed: May 4, 2005

(65) Prior Publication Data
US 2005/0242935 A1 Nov. 3, 2005

(51) Int. Cl.
B60Q 1/00 (2006.01)
(52) U.S. Cl. .................... 340/438; 340/442; 152/154.2
(58) Field of Classification Search ................ 340/442, 340/425.5, 444, 447, 438; 152/154.2, 209.5
See application file for complete search history.

(56) References Cited

U.S. PATENT DOCUMENTS 3,770,040 A * 11/1973 De Cicco ................ 152/152.1
6,220,199 B1 * 4/2001 Williams ..................... 116/208
6,278,361 B1 * 8/2001 Magiawala et al. ......... 340/438
6,883,567 B2 * 4/2005 Shimura .................. 152/154.2
2003/0042734 A1 * 3/2003 Kuwabara .................... 285/81

* cited by examiner

Primary Examiner—Phung T. Nguyen
(74) Attorney, Agent, or Firm—Caroline Barry

(57) ABSTRACT

A detection and warning system is presented. The system comprises a logic element, a conductive element, and an indicator. The conductive element is connected to the logic element. The conductive element is embedded at a predetermined location in an object such as a tire tread. When the conductive element breaks after the tire tread wears to a predetermined level, the logic element signals the indicator to warn of an unsafe condition.

18 Claims, 12 Drawing Sheets

DETECTION AND WARNING SYSTEM

FIELD OF THE INVENTION

The present invention generally relates to a detection and warning system, and, more particularly, to a detection and warning system for vehicles.

BACKGROUND OF THE INVENTION

Systems to detect and warn of unsafe conditions are frequently used in vehicles. Some systems detect unsafe conditions related to treads on a tire of a vehicle. A tire tread comprises a pattern of ridges or grooves made or cut into the face of a tire. Adequate vehicle tire treads are designed to grip a road surface to prevent a vehicle from sliding on the road during inclement weather. In contrast, inadequate tire treads may slide and cause a vehicle to move in an uncontrollable manner resulting in an accident. An inadequate tire tread is 1/16 inches away from a base of the tire.

There are several conventional systems that detect unsafe tire conditions. For example, U.S. Pat. No. 6,771,169 issued to Kaminski et al. on Aug. 3, 2004 detects an unsafe tire condition by monitoring a parameter such as tire pressure. The tire pressure is compared over time to detect tire tread separation.

U.S. Pat. No. 6,741,169 issued to Magiawala et al. on May 25, 2004 senses parameters such as tire pressure and acceleration to determine the condition of the tire. Each parameter is compared over time to determine tire tread wear. Once a significant difference is detected in one of the parameters, a warning signal is generated.

U.S. Pat. No. 6,722,192 issued to Benedict et al. on Apr. 20, 2004 also monitors tire pressure via a sensor. An antenna wirelessly signals a receiver if a significant difference in tire pressure is detected.

U.S. Pat. No. 6,631,637 issued to Losy on Oct. 14, 2003 is related to a tire pressure sensor mounting assembly coupled to the tire rim. The tire pressure is compared over time to determine whether a significant difference exists.

U.S. Pat. No. 6,666,080 issued to Buist et al. on Dec. 23, 2003 measures tire wear through pressure sensors mounted in the tire. All of these conventional sensor systems have drawbacks. For example, sensors add cost to detection systems. Additionally, sensors may fail or may not be as accurate as is needed to precisely detect conditions such as the wear on a tire tread. Furthermore, these conventional systems require memory to compare tire pressure data. Memory also increases the cost of conventional systems. It is therefore desirable to have a system that overcomes these disadvantages.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
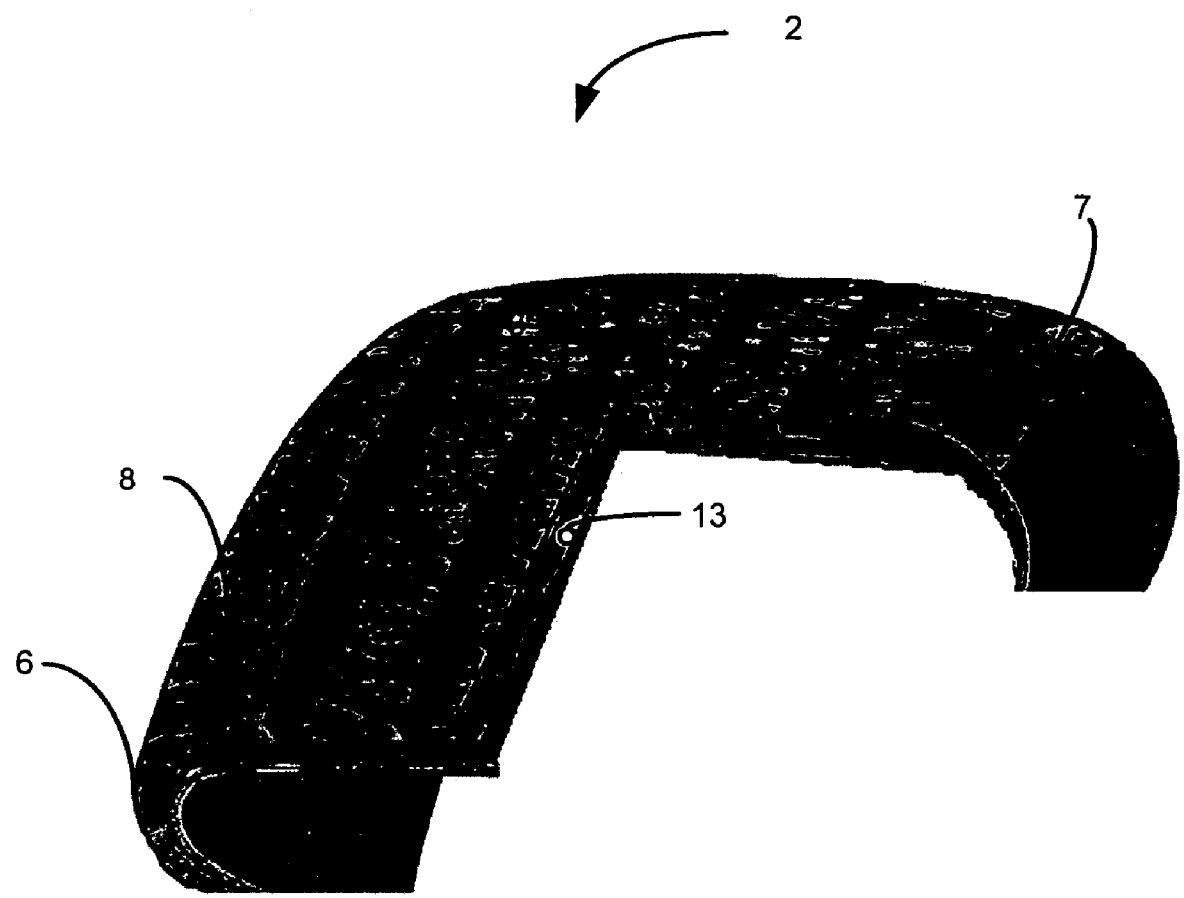
FIG. 1 is a perspective view of a tire of the present invention.

The following description is merely exemplary in nature and is in no way intended to limit the invention, its application, or uses. For purposes of clarity, the same reference numbers are used in the drawings to identify similar elements. As used herein, the term "module" or "controller" refers to an application specific integrated circuit (ASIC), an electronic circuit, a processor (shared, dedicated, or group) that execute one or more software or firmware programs, a combinational logic circuit, or other suitable components that provide the described functionality.

Control modules of the present invention detect and warn of unsafe conditions related to a vehicle. Generally, a control module comprises at least one conductive element or line, a logic gate, a transmitter, a receiver, and an indicator. The conductive element, embedded into a pre-selected location of a tread of a tire, is connected to the logic gate. A warning signal is generated when a significant change of voltage is detected by the control module. In one embodiment, a significant change of voltage is detected when the conductive element is broken due to its exposure to the road surface after a tire wears past its recommended thickness. A signal is then transmitted to a receiver mounted near the vehicle's wheel well. The received signal triggers an indicator or warning light on the vehicle's dashboard alerting the driver that the tire tread is worn past its expected life.

A skilled artisan understands that the present invention provides greater accuracy at detecting an unsafe condition at a lower cost than conventional systems. For example, placement of the conductive element or line at a predetermined level of the tread precisely indicates when the tire tread is worn to an inadequate level. Additionally, sensors and memory required by conventional systems are unnecessary to implement features of the present invention.

Figure 2:
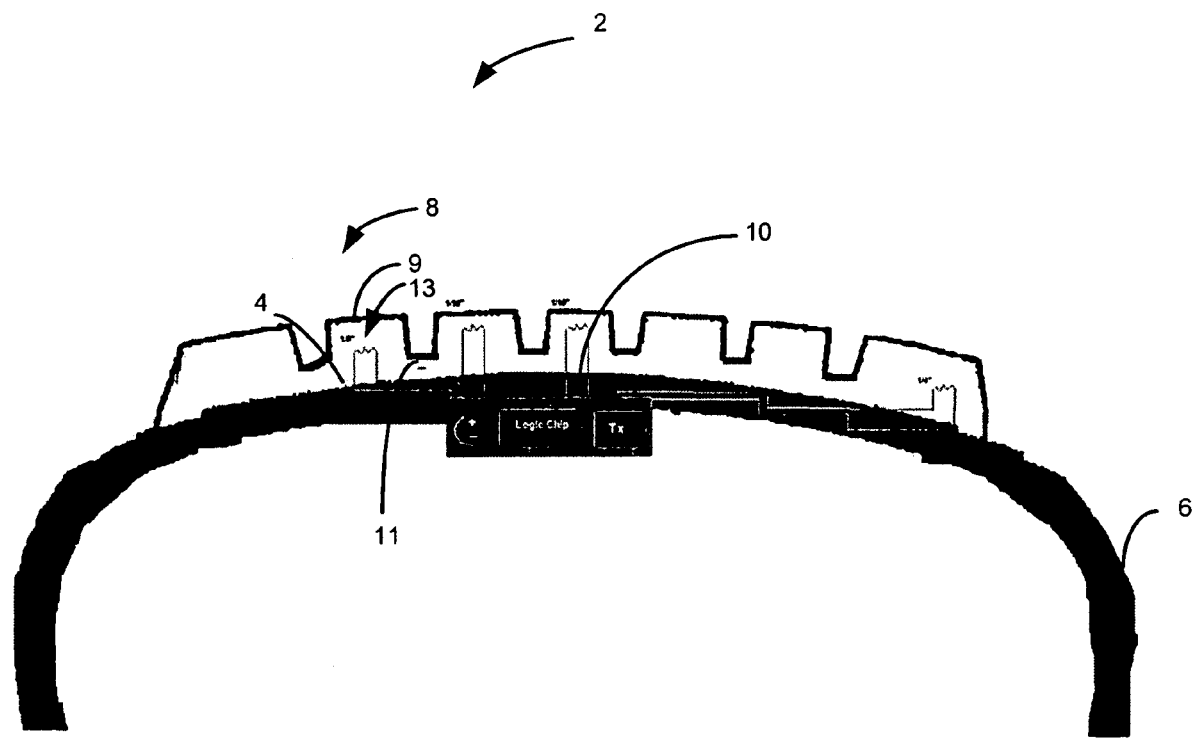
FIG. 2 is a cross-sectional view of a tire of the present invention.

FIGS. 1 and 2 depict details of a tire 2. Tire 2 has a base 4, sidewalls 6, and outer surface 7. Treads 8 are formed in the face of outer surface 7. Treads 8 extend from tread base 11 to unworn tread surface 9. One or more studs 13 define an unsafe tread 8.

Figure 3:
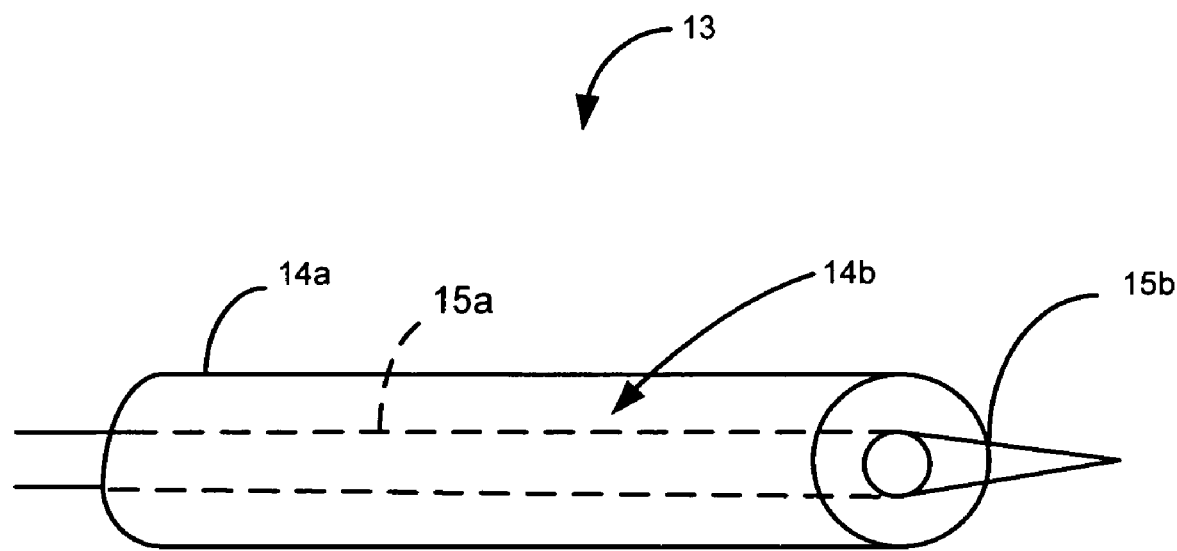
FIG. 3 is a block diagram of a stud of the present invention.

FIG. 3 depicts an exemplary stud 13 that has a nonconductive element 14a and a conductive element 14b (shown in ghost lines). Nonconductive element 14a may comprise plastic or other sturdy nonconductive material. Additionally, nonconductive element 14a substantially surrounds conductive element 14b. Conductive element 14b is a wire, filament, or other conductive material. Conductive element 14b may comprise a single portion or multiple portions coupled together. For example, conductive element 14b may comprise first conductive portion 15a and a second conductive portion 15b. In this embodiment, second conductive portion 15b breaks when exposed to friction such as tread 8 contacting a surface of a road. The first conductive portion 15a is surrounded by nonconductive element 14a. In comparison, second conductive portion 15b extends beyond nonconductive element 14a. As shown, conductive portion 15b has a varying diameter, which is a filament or wire that is part of a control module 10.

Figure 8A:
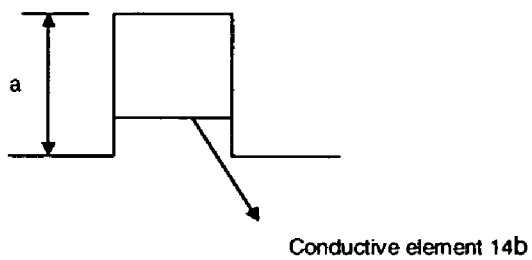
FIGS. 8A-8C are block diagrams that depict a tread in various stages of use relative to a conductive element.

Control module 10, disposed beneath base 4, detects and warns of an unsafe condition (e.g. an inadequate tire tread etc.) related to a vehicle. Conductive element 14b is embedded at a depth of greater than or equal to a minimum specified level from tread base 11 of tread 8, as depicted by range a in FIG. 8A. For example, conductive element 14b may be placed at a depth of about 1/16 inches to about 3/32 inches from tread base 11. The minimum specified level may be established by law (e.g. regulation or statute). Alternatively, the minimum specified level is recommended by a business organization or a government agency. The maximum range c to embed conductive element 14b is depicted in FIG. 8C. The maximum range c includes distances from tread base 11 to embed conductive element 14b that exceed the minimum specified level but still provides practical wear to treads 8. Other suitable ranges may also be used.

Figure 4A:
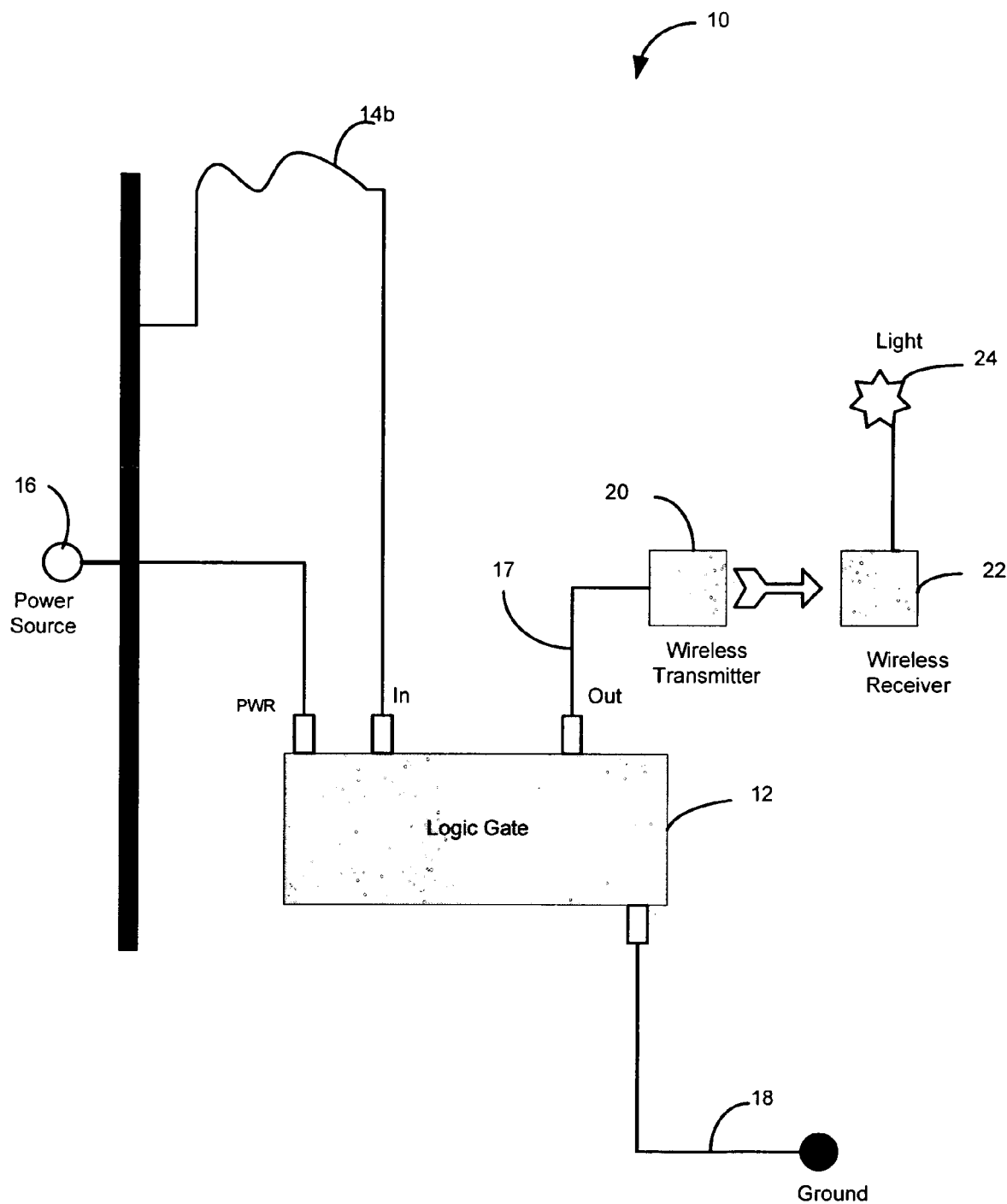
FIG. 4A is a schematic diagram of a control module to detect and warn of an unsafe condition of the present invention.
Figure 4B:
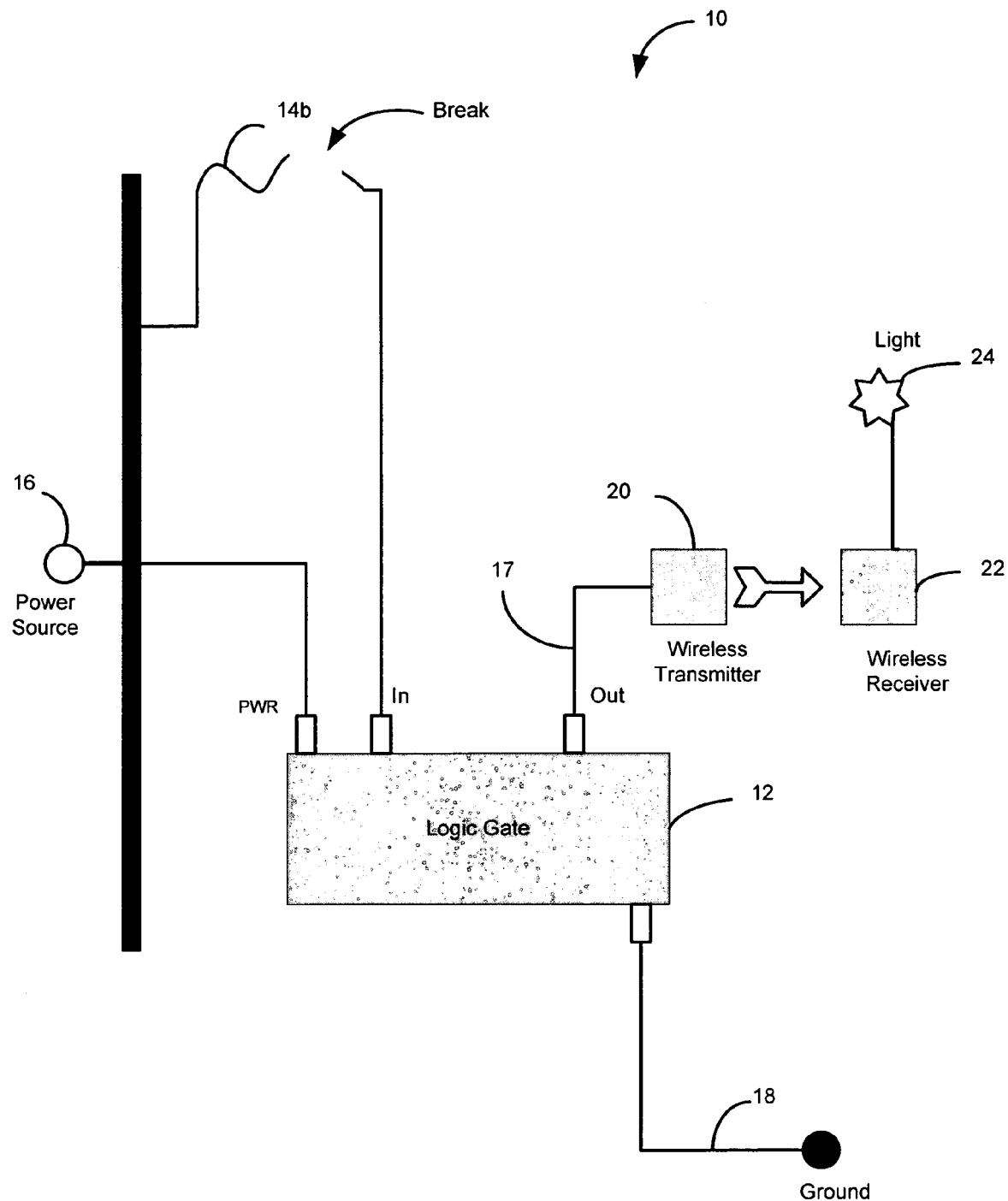
FIG. 4B is a schematic diagram of the control module of FIG. 4A that warns of an unsafe condition.

FIGS. 4A through 4B illustrate the operation of control module 10. Control module 10 comprises a logic gate 12, a transmitter 20, a receiver 22, an indicator 24, a power source 16 (e.g. battery etc.), and ground 18. Logic gate 12 (e.g. inverter, XOR gate, etc.) is connected to power source 16 (e.g. battery at 5 volts) and to ground via conductive element 14b and 18, respectively.

Power source 16 (e.g. battery, etc.), coupled to conductive element 14b, generates a HIGH input signal (e.g. 5 volts) to logic gate 12. In this embodiment, logic gate 12 is an inverter that inverts the HIGH signal and outputs a LOW signal (e.g. 0 to 1 volts) to transmitter 20 over conductive line 17. Transmitter 20 wirelessly signals receiver 22 with a LOW signal. Receiver 22 then signals indicator 24 (e.g. warning light on a vehicle dashboard etc.) with a LOW signal. Indicator 24 does not warn of an unsafe condition.

Figure 8B:
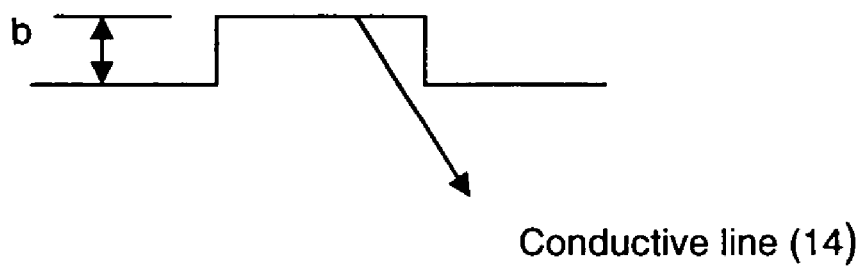
Figure 8C:
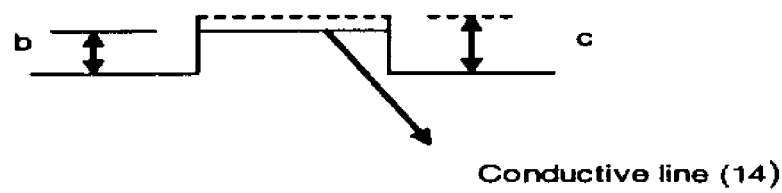

Referring to FIGS. 4B and 8B, conductive element 14b is broken due to a worn tread 8. Since conductive element 14b is broken, logic gate 12 inverts the LOW signal to a HIGH signal, which is transmitted to transmitter 20. Transmitter 20 then wirelessly signals receiver 22. Receiver 22 signals indicator 24 with a HIGH signal, which is sufficient to activate indicator 24 on the vehicle's dashboard. Indicator 24 then alerts the driver that the tire is worn past its expected tread life.

Figure 5A:
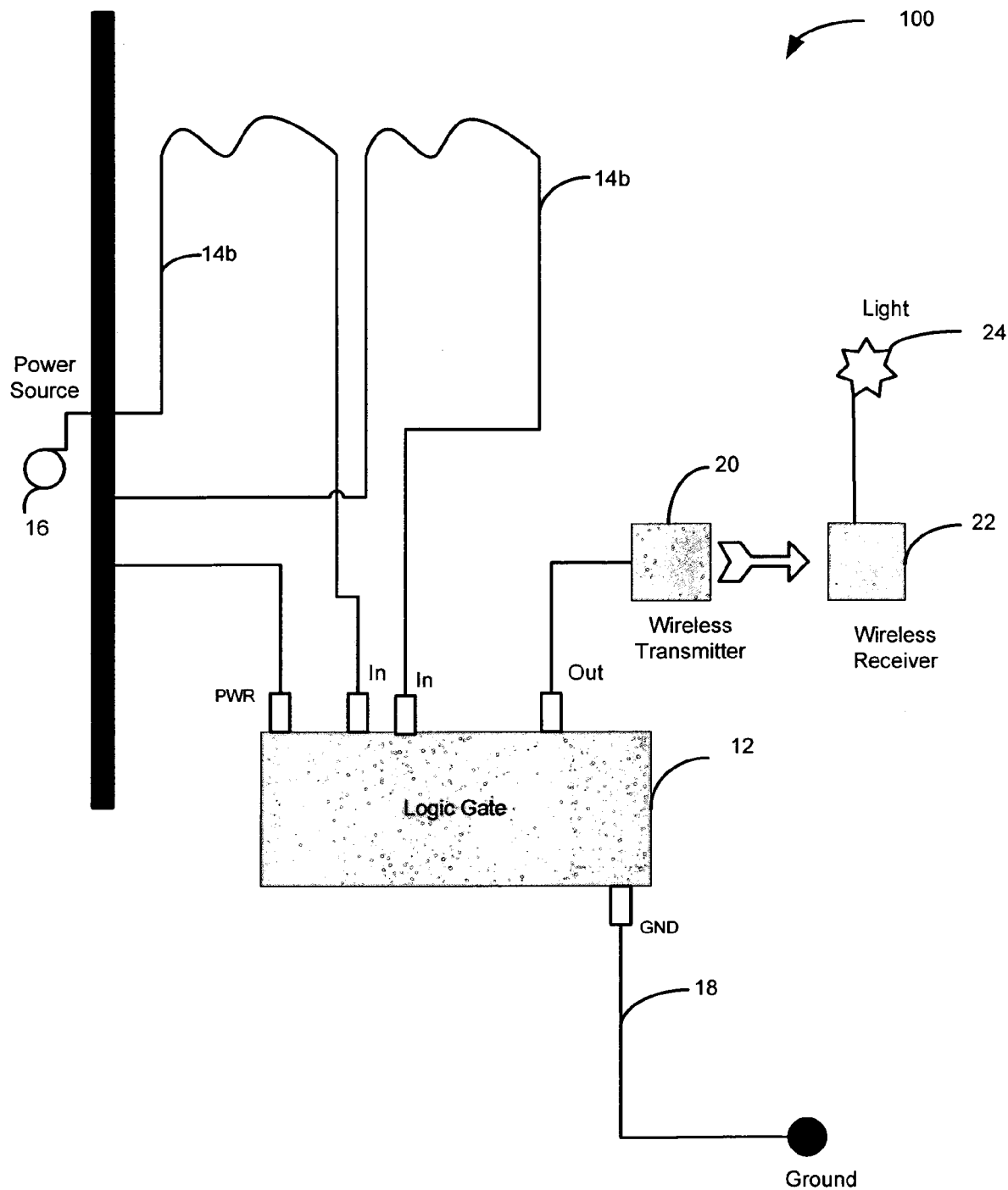
FIG. 5A is a schematic diagram of another control module of the present invention.
Figure 5B:
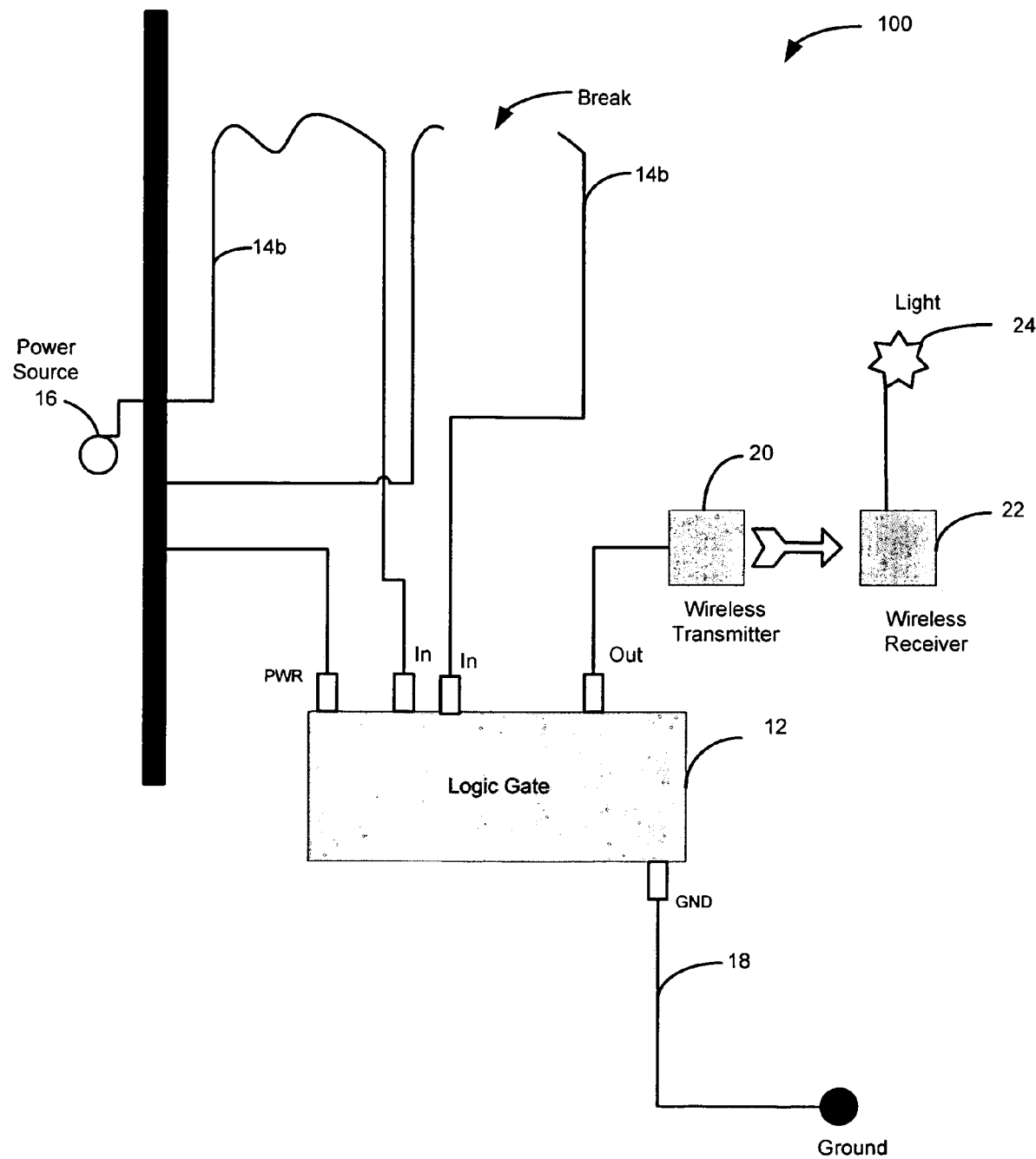
FIG. 5B is a schematic diagram of the control module of FIG. 5A that warns of an unsafe condition.

FIG. 5A is a schematic diagram of control module 100 that detects and warns of an unsafe condition (e.g. an inadequate tire tread etc.) related to a vehicle. Control module 100 comprises a logic gate 12, a plurality of conductive elements 14b, an indicator 24, a power source 16, and ground 18. In this embodiment, logic gate 12 is a XOR gate. Logic gate 12, receives HIGH signal inputs via conductive elements 14b. Once one of the conductive elements 14b breaks as shown in FIG. 5B, the XOR gate logic generates a HIGH signal to transmitter 20. Transmitter 20 then signals receiver 20 with a HIGH signal, which activates indicator 24.

Figure 6:
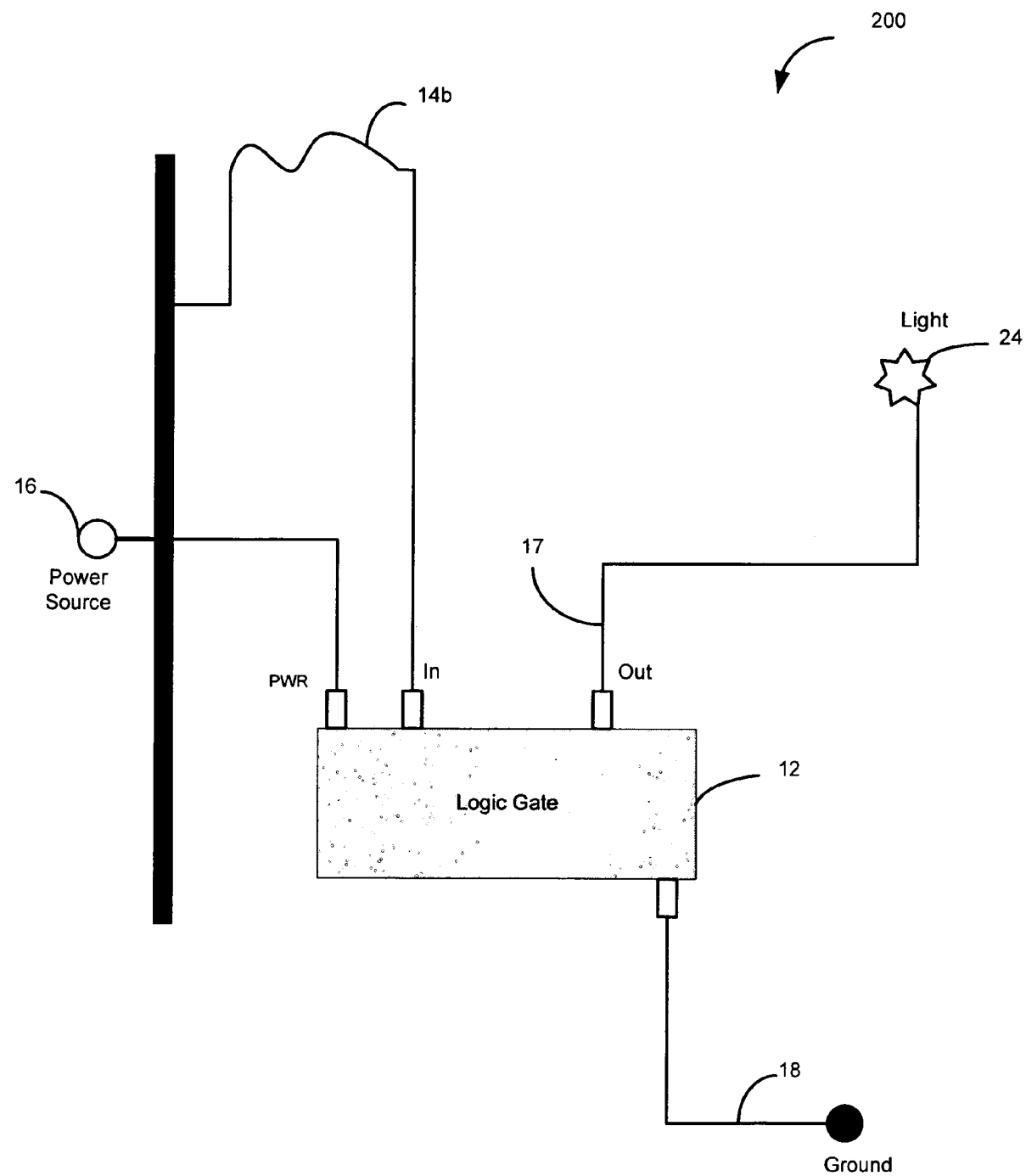
FIG. 6 is a schematic diagram of still yet another control module of the present invention.

FIG. 6 is a schematic diagram of control module 200 that detects and warns of an unsafe condition (e.g. an inadequate tire tread etc.) related to a vehicle. Control module 200 comprises a logic gate 12, an indicator 24, a power source 16, and ground 18. In this embodiment, logic gate 12 is directly connected to indicator 24 through conventional means. This direct connection between logic gate 12 and indicator 24 makes transmitter 20 and receiver 22 unnecessary.

While conductive element 14b remains directly connected to logic gate 12, an unsafe condition is not detected. Once the tire tread 8 wears past a predetermined level which breaks conductive element 14b, an unsafe condition is detected by logic gate 12. A warning signal over conductive line 17 is transmitted to indicator 24. Indicator 24 then warns the driver that the tire tread is worn to a level that requires replacement of the tire.

Figure 7:
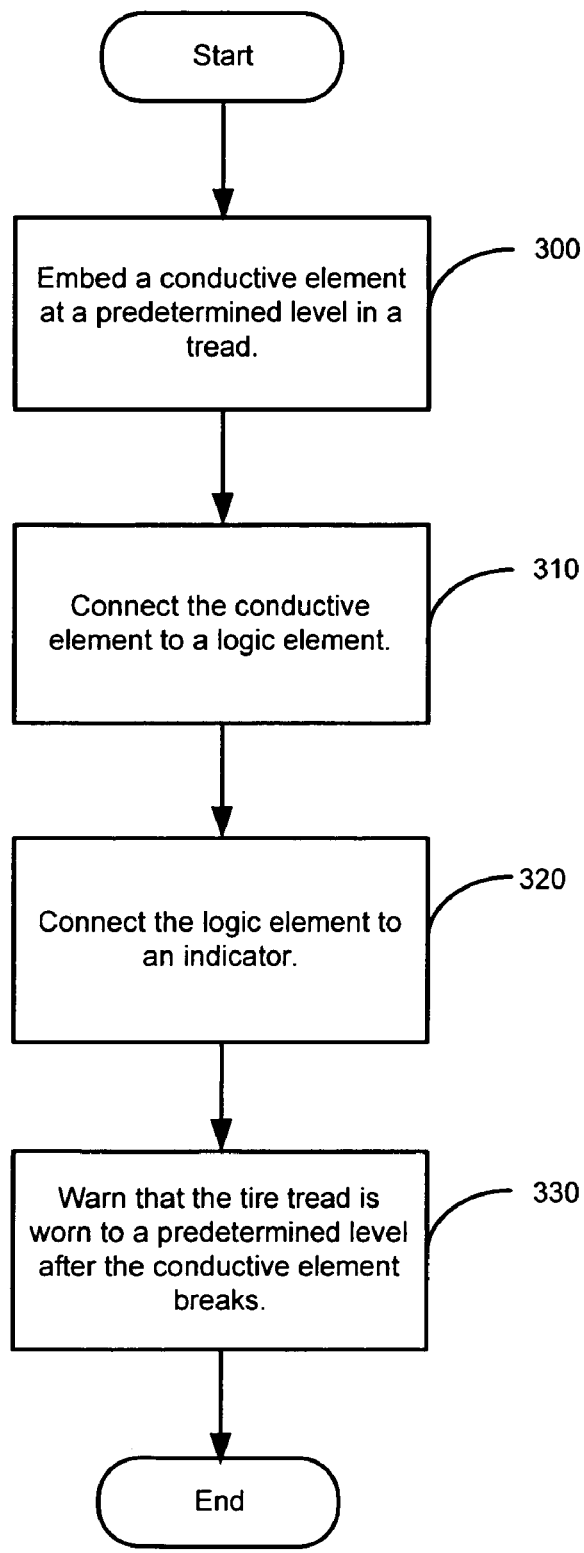
FIG. 7 illustrates a flow diagram of a method to detect and warn of an unsafe condition of the present invention.

FIG. 7 is a flow diagram of a method to detect and warn of unsafe conditions. At operation 300, a conductive element is embedded at a predetermined level into a tire tread. At operation 310, the conductive element is connected to a logic element such as a logic gate. At operation 320, the logic element is connected to an indicator. At operation 330, after a tire tread wears past a predetermined level which breaks the conductive element, a warning signal is transmitted from the logic gate to the indicator.

Skilled artisans understand that alternative embodiments may be implemented. For example, principles of the present invention could be applied to brakes in a vehicle. The conductive elements or line(s) are placed in a suitable location in the brake liners to warn of impending loss of thickness in the liners, thus avoiding dangerous conditions of brake failure. In another embodiment, the stud(s) may be shaped as wafers, lines or other suitable shapes. The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A tire tread warning system comprising:
   a logic element;
   a conductive element connected to the logic element, the conductive element embedded at a predetermined location in the tire tread;
   a transmitter coupled to the logic element;
   a receiver electrically coupled to the transmitter;
   an indicator coupled to the receiver,
   wherein the conductive element breaks after the tire tread wears to a predetermined level, and the logic element signals the transmitter, the transmitter wirelessly signals the indicator to warn of an unsafe condition, wherein the logic element is one of an inverter and a XOR gate.

2. The tire tread warning system of claim 1 wherein the conductive element is a filament.

3. The tire tread warning system of claim 1 wherein the conductive element is embedded at a depth of greater than or equal to 1/16 inches from a base of the tire tread.

4. The tire tread warning system of claim 1 wherein another conductive element is embedded into another predetermined location in the tire tread.

5. A tire tread warning system comprising:
   a logic gate being one of an inverter and a XOR gate;
   a conductive line connected to the logic gate, the conductive line embedded at a predetermined location in the tire tread;
   an indicator coupled to the logic gate,
   wherein the conductive line breaks after the tire tread wears to a predetermined level which causes the logic gate to signal the indicator to warn of an unsafe condition.

6. The tire tread warning system of claim 5 wherein the conductive line is embedded at a depth in a range of about 3/32 inches to about 1/16 inches from the base of the tire tread.

7. A method for detecting and warning of a worn tire tread comprising:
- embedding a conductive line at a predetermined depth into the tire tread;
- coupling a power source to the conductive line;
- coupling a logic gate to the conductive line, the logic gate being one of inverter and a XOR gate; and
- detecting a worn tire tread when the conductive line breaks.

8. The method of claim 7, further comprising:
indicating a worn tire tread.

9. The method of claim 7, further comprising:
- transmitting a first signal from the logic gate to a transmitter;
- transmitting a second signal from the transmitter to a receiver through wireless communication; and
- transmitting a third signal from the receiver to an indicator to warn of the worn tire tread.

10. The method of claim 7, further comprising:
embedding another conductive line into the tire tread.

11. The method of claim 7, wherein the conductive line is embedded within a range of about 3/32 inches to about 1/16 inches from the base of the tire tread.

12. A control module for indicating a worn tire tread comprising:
- a logic gate being one of an inverter and a XOR gate;
- a conductive line connected to the logic gate, the conductive line embedded at a predetermined location in the tire tread;
- an indicator coupled to the logic gate,
- wherein the conductive line breaks after the tire tread wears to a predetermined level and the logic gate signals the indicator to warn of an unsafe condition.

13. The control module of claim 12, wherein the logic gate is one of an inverter and a XOR gate.

14. The control module of claim 12, wherein the conductive line is embedded in a range of about 1/16 inches to about 3/32 inches from the base of the tire tread.

15. A control module for indicating an unsafe vehicle condition comprising:
- a logic element being one of an inverter and a XOR gate;
- a conductive element connected to the logic element, the conductive element embedded at a predetermined location in the vehicle between a first object that contacts a second object;
- an indicator coupled to the logic element,
- wherein the conductive line breaks after the first object wears to a predetermined level and the logic element signals the indicator to warn of an unsafe condition.

16. The control module of claim 15 wherein the first object is one of a tire tread and a brake liner.

17. The control module of claim 16 wherein the conductive element being embedded in the brake liner to warn of impending loss of thickness in the brake liner.

18. The control module of claim 15 wherein the unsafe condition relates to one of a worn tire tread, and a worn brake liner.

* * * * *